(12) United States Patent
Bibby

(10) Patent No.: US 8,978,861 B2
(45) Date of Patent: Mar. 17, 2015

(54) FRICTION CLUTCH PLATE WITH DAMPING SPRINGS

(75) Inventor: Damian Bibby, Greensborough (AU)

(73) Assignee: Clutch Industries Pty Ltd (AU)

( * ) Notice: Subject to any disclaimer, the term of this patent is extended or adjusted under 35 U.S.C. 154(b) by 0 days.

(21) Appl. No.: 14/003,585

(22) PCT Filed: Jun. 29, 2011

(86) PCT No.: PCT/AU2011/000807
§ 371 (c)(1),
(2), (4) Date: Oct. 17, 2013

(87) PCT Pub. No.: WO2012/119179
PCT Pub. Date: Sep. 13, 2012

(65) Prior Publication Data
US 2014/0027239 A1 Jan. 30, 2014

(30) Foreign Application Priority Data
Mar. 8, 2011 (AU) ................................ 2011900820

(51) Int. Cl.
*F16H 3/14* (2006.01)
*F16D 13/68* (2006.01)
(Continued)

(52) U.S. Cl.
CPC ............ *F16D 13/686* (2013.01); *F16F 15/123* (2013.01); *F16D 13/64* (2013.01)
USPC ........................................................ 192/203

(58) Field of Classification Search
USPC .............. 192/203, 213, 213.1, 213.22, 70.17, 192/213.21, 212, 213.3, 214, 205, 214.1
See application file for complete search history.

(56) References Cited

U.S. PATENT DOCUMENTS 4,396,103 A * 8/1983 Loizeau .................... 192/213.21
4,679,679 A * 7/1987 Lech et al. ............... 192/213.31
(Continued)

FOREIGN PATENT DOCUMENTS

EP 0412559 B1 2/1994
GB 1230284 A 4/1971
(Continued)

OTHER PUBLICATIONS

International Search Report for Application No. PCT/AU2011/000807 dated Sep. 26, 2011.

*Primary Examiner* — Saul Rodriguez
*Assistant Examiner* — David J Hlavka
(74) *Attorney, Agent, or Firm* — Lerner, David, Littenberg, Krumholz & Mentlik, LLP

(57) ABSTRACT

A clutch plate (100) including a plate assembly (111) having an annular periphery to which an assembly of friction material (114,115) is applied to face in opposite directions. A hub (120) is provided for connection to an output shaft and a hub flange (132) is driveable by the plate assembly to rotate. The hub (120) is driveable to rotate by the hub flange (132). The hub (120) and the hub flange (132) are angularly displaceable relative to each other within a predetermined range and are coupled together by a tension spring (125) which extends radially relative to the axis of rotation of the hub and which applies a biasing load against relative angular displacement between the hub (120) and the hub flange (132). A further embodiment is disclosed where the plate assembly (111) and the hub flange (132) are angularly displaceable relative to each other within a predetermined range and being coupled together by at least two curved drive springs (150 151) having a constant radius of curvature and being mounted concentric about the hub (120).

15 Claims, 9 Drawing Sheets

(51) Int. Cl.
  *F16F 15/123*   (2006.01)
  *F16D 13/64*    (2006.01)

(56) References Cited

U.S. PATENT DOCUMENTS

| | | | | |
|---|---|---|---|---|
| 4,969,855 | A | * | 11/1990 | Graton et al. ............ 464/63.1 |
| 5,090,945 | A | * | 2/1992 | Graton et al. ............ 464/64.1 |
| 5,813,915 | A | * | 9/1998 | Imanaka .................. 464/68.41 |
| 5,823,516 | A | * | 10/1998 | Despres .................... 267/168 |
| 5,857,552 | A | * | 1/1999 | Hashimoto .............. 192/213.21 |
| 5,882,264 | A | * | 3/1999 | Yabe et al. ................ 464/64.1 |
| 6,029,793 | A | | 2/2000 | Tanaka et al. |
| 6,062,103 | A | * | 5/2000 | Soares et al. ............. 464/68.4 |
| 6,257,089 | B1 | * | 7/2001 | Hashimoto et al. ....... 464/68.8 |
| 7,886,887 | B2 | * | 2/2011 | Bassett et al. ........... 192/105 CP |

FOREIGN PATENT DOCUMENTS

GB 2317940 A 4/1998
JP 08121535 5/1996

\* cited by examiner

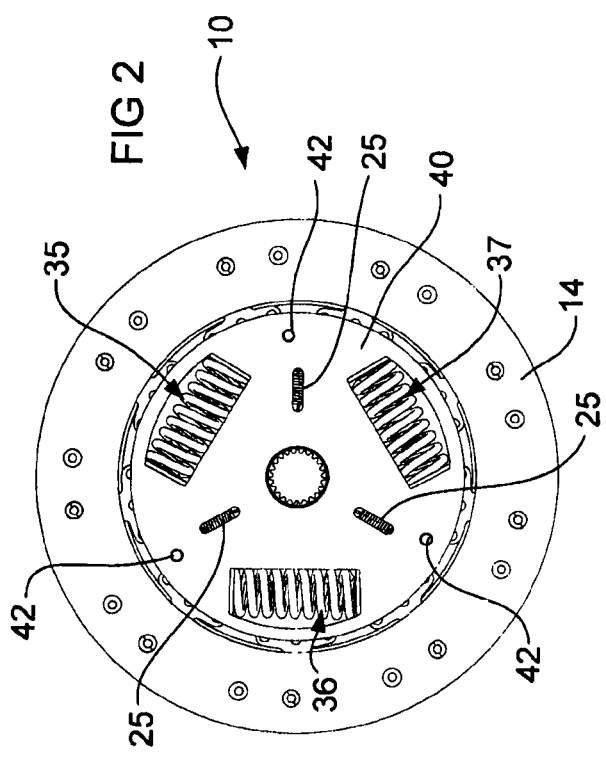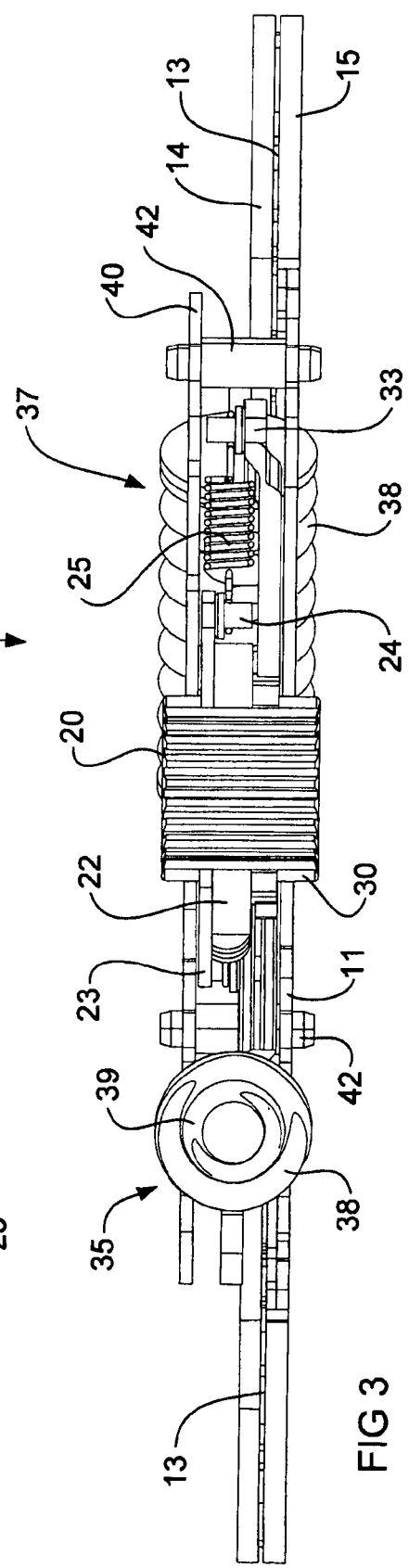

FRICTION CLUTCH PLATE WITH DAMPING SPRINGS

CROSS-REFERENCE TO RELATED APPLICATIONS

The present application is a national phase entry under 35 U.S.C. §371 of International Application No. PCT/AU2011/000807 filed Jun. 29, 2011, published in English, which claims priority from Australian Patent Application No. 2011900820 filed Mar. 8, 2011, the disclosures all of which are incorporated herein by reference.

The present invention relates to a friction clutch assembly, principally for use in the automotive sector, for manual transmission cars and trucks, although the invention could have wider application. The invention is particularly directed to the clutch plate of a clutch assembly. It will be convenient to describe the invention as it relates to the automotive sector, although it is to be appreciated that the invention is not limited to use in that sector only.

BACKGROUND OF THE INVENTION

A friction clutch assembly or "clutch" of a car or other automobile having a manual transmission is generally located between the engine and the drive train. The assembly normally includes three adjacent annular plates, including a flywheel that is rotatably driven by the crank shaft, a clutch plate (otherwise known as a driven plate), and a pressure plate that is biased by energy storing devices, such as one or more springs, towards the clutch plate and flywheel to clamp the clutch plate between the flywheel and the pressure plate.

The frictional engagement of the coupling faces of the clutch plate with the adjacent rotating coupling faces of the flywheel and the pressure plate allow the clutch plate to transfer power generated by the engine to the remainder of the drive train. However, unless there is some form of dampening in the drive line to dissipate the irregular impulses of the internal combustion petrol or diesel engine, these impulses will create unwanted driveline noise, which occurs due to blacklash between meshed gears in the gearbox. While all undampened engine vibrations will create noise in the gearbox, the driveline noise is particularly evident when the vehicle is in neutral gear and the clutch is engaged. That noise is known in the industry as "gear rollover noise".

To prevent transmission of engine impulses through to the gearbox whilst the vehicle is in neutral and the clutch is engaged, a clutch plate with dampening, usually in the form of coil springs or other dampening means, can be used. While a clutch assembly would ordinarily already employ dampening springs, known as drive springs, for the transmission of power from the engine to the gearbox, the dampening required for that purpose is different to the dampening required to address gear rollover noise. Accordingly, a separate dampening system is usually required. That separate dampening system must be capable of wide angular displacement at low torque, for example 0.1 to 0.6 Nm/degree or <1 Nm/degree, to dampen gear rollover noise. This differs from the drive springs which require higher torque capacity, ie usually 120% of the maximum vehicle torque capacity and typically 20 to 80 Nm/degree or >20 Nm/degree.

A typical clutch plate includes a splined hub that accepts a splined shaft to transmit engine rotation to the gearbox or transmission. The splined hub can be connected to a flange via an arrangement which provides for limited angular displacement between the hub and the hub flange. Spring dampening between the hub and the hub shaft can be used to dampen gear rollover noise.

In an arrangement of the above kind, the hub flange can be sandwiched between a main plate and a side plate which are fixed together, and whereby the hub flange is driven to rotate when the main plate is shifted into engagement with the flywheel of an engine through a friction material fixed to the circumferential edge of the main plate, The main and side plate assembly (hereinafter the "plate assembly") and the hub flange are connected by drive springs, to provide limited angular displacement between them. The angular displacement in this case is provided to dampen torsional vibration in the drive mode of the vehicle rather than gear rollover noise when the transmission is in neutral and the clutch is engaged.

Where the dampening system for dampening gear rollover noise is provided between the hub and the hub flange, the dampening has been provided in some prior art arrangements by circumferential compression springs. However, these systems are limited by the small degree of angular displacement they allow between the hub and the hub flange. Typically, the angular displacement which is required to eliminate gear rollover noise is very wide, but the space available to accommodate the circumferential compression springs of the prior art systems is not necessarily sufficient to permit the angular displacement required for complete or substantial dampening of the gear rollover noise. Maximum angular displacement can be achieved by positioning the compression spring at the maximum distance radially away from the centre of the hub. However, the further the spring is positioned away from the hub, the longer the spring is required to be for the same angular displacement. This can create space problems because the distance the springs can be positioned away from the hub is limited by other components of the clutch, such as the drive springs between the hub flange and the plate assembly and the inside diameter of the friction material. Accordingly, there is normally a compromise between obtaining the maximum angular displacement and the length of the spring that can be used.

U.S. Pat. No. 6,029,793 discloses a clutch assembly that includes a dampening arrangement comprising a plurality of coil springs each disposed circumferentially. When a torsional vibration occurs, the various springs compress through relative movement between the input rotary members driven by the flywheel and the output rotary member which drives the transmission shaft. Four different sets of springs are provided. With reference to FIG. 2 of U.S. Pat. No. 6,029,793, the position of the various springs is crowded so that the angular displacement is limited. Moreover, the complexity of the arrangement makes it more expensive to manufacture and assemble.

Where the dampening system for dampening gear rollover noise is not sufficient for dampening the noise to an acceptable level, often the solution is to employ a dual mass flywheel. This solution will often provide sufficient dampening to overcome the gear rollover noise, but such flywheels are very expensive and are therefore not preferred.

The present invention therefore recognises the need to provide a solution to address gear rollover noise.

In respect of drive springs, prior art friction clutch assemblies typically employ straight coil compression springs to drive between the plate assembly (previously defined as the combination of the main plate and the side plate) of the clutch assembly that engages the flywheel of an engine, and the hub flange of the clutch assembly. In some other clutch assemblies, straight rubber cylinders are employed.

The preference for using straight coil compression springs arises on the basis that they are easy to manufacture and are therefore inexpensive. In addition, the clutch plate of a traditional clutch assembly has a low angular displacement (as described above) and because of this, spring forces generated in the drive springs are substantially directed along the spring axis, despite that the forces load the spring at a slight angle. Given that the spring forces are substantially loading the spring along its axis, a straight compression spring is sufficient for that purpose.

In a traditional clutch plate as described above, the drive springs can also operate without the need for guides along their length, to maintain them straight. This has the consequential benefit that the springs do not unnecessarily rub on other components of the clutch assembly, which would otherwise cause wear and generate heat, both of which can be detrimental to the life of the clutch plate.

The benefits of using straight coil compression springs in a traditional clutch plate which has low angular displacement do not apply if the clutch plate has a wider angular displacement. In that form of clutch plate, the drive springs need to be long enough to extend across the wider angle of displacement, but they also need to remain strong enough to match the torque of the engine that is to be transmitted through the clutch plate. Because the drive springs in this form of clutch plate are required to be longer than those of a clutch plate having low angular displacement, it is not ordinarily possible to fit the longer spring into the space available at the centre of the clutch plate where the shorter form of spring is usually fitted.

Moreover, if a longer straight coil compression spring is used as a drive spring in a clutch plate having a wider angle of displacement, as the spring is compressed, the spring force will no longer act along the axis of the spring and thus the normal compressive strength of the spring will not be available. The longer spring is actually forced into a trapezoidal shape by the hub flange acting against the side and main plates of the clutch plate.

Accordingly, in a clutch plate having a wider angle of displacement, the applicant has recognised the need to provide an alternative drive spring arrangement.

SUMMARY OF THE INVENTION

The present invention provides a clutch plate including:
a plate assembly having an annular periphery to which an assembly of friction material is applied to face in each of opposite directions,
a hub for connection to an output shaft,
a hub flange drivable by the plate assembly to rotate,
the hub being drivable to rotate by the hub flange,
the hub and the hub flange being angularly displaceable relative to each other within a predetermined range and being coupled together by a tension spring which extends radially relative to the axis of rotation of the hub and which applies a biasing load against relative angular displacement between the hub and the hub flange.

The radial tension spring oscillates as the hub and hub flange are displaced relative to each other, or in other words, rotate relative to each other. The radial tension spring thus dampens the vibrations that cause gear rollover noise and advantageously, by the use of a radially acting spring, the angular displacement that can be accommodated between the hub and hub flange is much greater than with a circumferential spring of the prior art.

It follows that in a clutch assembly of the above kind, the angular displacement which can be provided by the radial torsion spring is wider, potentially much wider, than the known arrangements that employ circumferential compression springs. Moreover, in a clutch assembly of the above kind, the extension of the radial tension spring radially rather than circumferentially permits the spring to be more easily accommodated in the clutch plate than the circumferential springs of the prior art.

The angular displacement achievable by a circumferentially extending spring is in the order of up to 14 degrees. This compared with a radial tension spring in which the angular displacement can be in the order of up to 60 degrees.

While a single radial tension spring can be employed, in some arrangements, two or more springs are employed. In an arrangement in which a pair of springs is employed, the springs can be disposed at any suitable orientation, but most likely, diametrically opposite to each other. In other arrangements, three or four springs are employed. In these arrangements, the springs can be spaced apart equidistantly about the hub or in any other suitable orientation. In fact, any number of springs, ie more than four, can be employed and the number can be odd or even.

The length of the radial tension springs can be selected to suit the clutch plate to which the springs are fitted. In arrangements that have been designed to date, the length of the spring when fitted between the hub and the hub flange has been approximately 30 mm (in a coil spring, this can comprise an overall spring length of 30 mm with an actual coil length of 15 mm). However, the length of the spring and the spring constant can be selected to produce the level of angular displacement required. It is envisaged that the spring length could vary in dimensions from 20 mm to 60 mm. The spring constant could be in the range of 1 to 10 kg/mm.

The radial tension spring is most likely to be a coil spring, although other forms of spring could be employed. For example, an elastomer cord could be employed.

Opposite ends of the radial tension spring can be anchored in place in any suitable manner. In some forms, the opposite ends can be anchored in a simple manner by upstanding rivets. For this form of anchor, the spring ends can be formed to accept the rivet, so that in a coil spring for example, one or more end coils of the spring can be shifted laterally to the axis of the coil to present an opening for the rivets to extend through.

The present invention also provides a clutch plate including:
a plate assembly having an annular periphery to which an assembly of friction material is applied to face in each of opposite directions,
a hub for connection to an output shaft,
a hub flange drivable by the plate assembly to rotate,
the hub being drivable to rotate by the hub flange,
the plate assembly and the hub flange being angularly displaceable relative to each other within a predetermined range and being coupled together by at least two drive springs, which are positioned equidistantly about the hub, the drive springs being compression springs and being curved and having a substantially constant radius of curvature and being mounted concentric about the hub, the drive springs applying a biasing load against relative angular displacement between the plate assembly and the hub flange.

The use of curved drive springs can provide significant advantages in respect of clutch plates that require or have high or wide angles of displacement. In particular, the use of curved springs is expected to allow significantly greater angular displacement between the plate assembly and the hub flange than the prior art use of straight compression coil springs. For example, it is expected that the use of curved compression springs will allow up to about 60° angular displacement between the hub flange and the plate assembly. To applicant's knowledge, this amount of angular displacement has never been achieved before with straight coil compression springs.

Moreover, while the curved springs can be manufactured curved, the drive springs can alternatively be formed in the traditional manner as straight springs, and the curvature can be introduced in the springs through the structure of the clutch plate, or by subsequent forming and heat treatment to hold the curved shape during the spring forming process. For example, the drive springs can be disposed within a curved slot formed in the hub flange, whereby the side edges of the slot can impose the curvature to the drive springs. Alternatively, each of the side and main plates, or one of the plates can include an arcuate guide as a spring guide, such as an arcuate channel, trough or the like, for receipt of a circumferential portion of the drive springs. The spring guide could accept approximately 90° of the circumference of the spring and if provided in each of the side and main plates, approximately 180° of the spring could be accepted in the respective guides. In this arrangement, the spring guides can impose the curvature on the drive springs, or they can assist to impose that curvature in combination with a curved slot formed in the hub flange.

Still further, other fixtures can be provided in the clutch plate assembly to impose the curvature to the drive springs. Accordingly, a variety of different arrangements can be employed to curve an otherwise straight drive spring into the curve required for a clutch assembly of the present invention.

The curved drive spring arrangement as described above could be lubricated, so that where the drive springs are in engagement with surfaces of other components of the clutch plate, and where that engagement involves movement, wear of the spring and the respective surfaces can be minimised. The drive springs can also be enclosed within a housing, with the surfaces of the housing that the spring engages being of a wear resistant material.

The clutch assembly according to the invention could include a pair of drive springs, which are positioned on opposite sides of the hub, diametrically opposed to one another. Alternatively, three drive springs could be employed and which are positioned at approximately 120° to each other. Still further, four drive springs could be employed which are positioned at approximately 90° to each other. It will be appreciated that any number of drive springs could be employed as required and the number of drive springs may increase as the size of the clutch plate increases.

The drive springs for use in a clutch plate of the invention typically will be coil springs, although other forms of springs could be used as applicable. Rubber cylinders could be employed for example.

The two forms of the present invention as described above can be combined, so that curved compression drive springs can be combined with radial tension springs in order to dampen internal combustion engine impulses. As explained earlier, the curved compression springs can be provided to dampen impulses which occur in a drive mode of a vehicle, whereas the radial tension springs are provided to dampen gear roll-over noise, which generally occurs when the clutch assembly is engaged but the transmission is in neutral, so that the vehicle is usually stationary.

Where a combination of compression and radial tension springs are adopted, the radial tension springs can extend in the gaps between the compression drive springs. Combinations of the respective springs can be as follows:

three radial tension springs combined with three curved drive springs four radial tension springs combined with four curved drive springs two radial tension springs combined with four curved drive springs two radial tension springs combined with six curved drive springs.

It is to be appreciated, that depending on the size of the clutch plate and the damping required, any combination of radial tension springs and curved drive springs could be employed.

The present invention also extends to clutch assemblies that include clutch plates according to the invention and to drivelines in vehicles that include clutch plates according to the invention.

For a better understanding of the invention and to show how it may be performed, embodiments thereof will now be described, by way of non-limiting example only, with reference to the accompanying drawings.

BRIEF DESCRIPTION OF THE DRAWINGS

FIG. 2 is a plan view of the clutch plate of FIG. 1.

FIG. 3 is a cross-sectional view taken through X-X of FIG. 2.

DETAILED DESCRIPTION OF THE DRAWINGS

Figure 1:
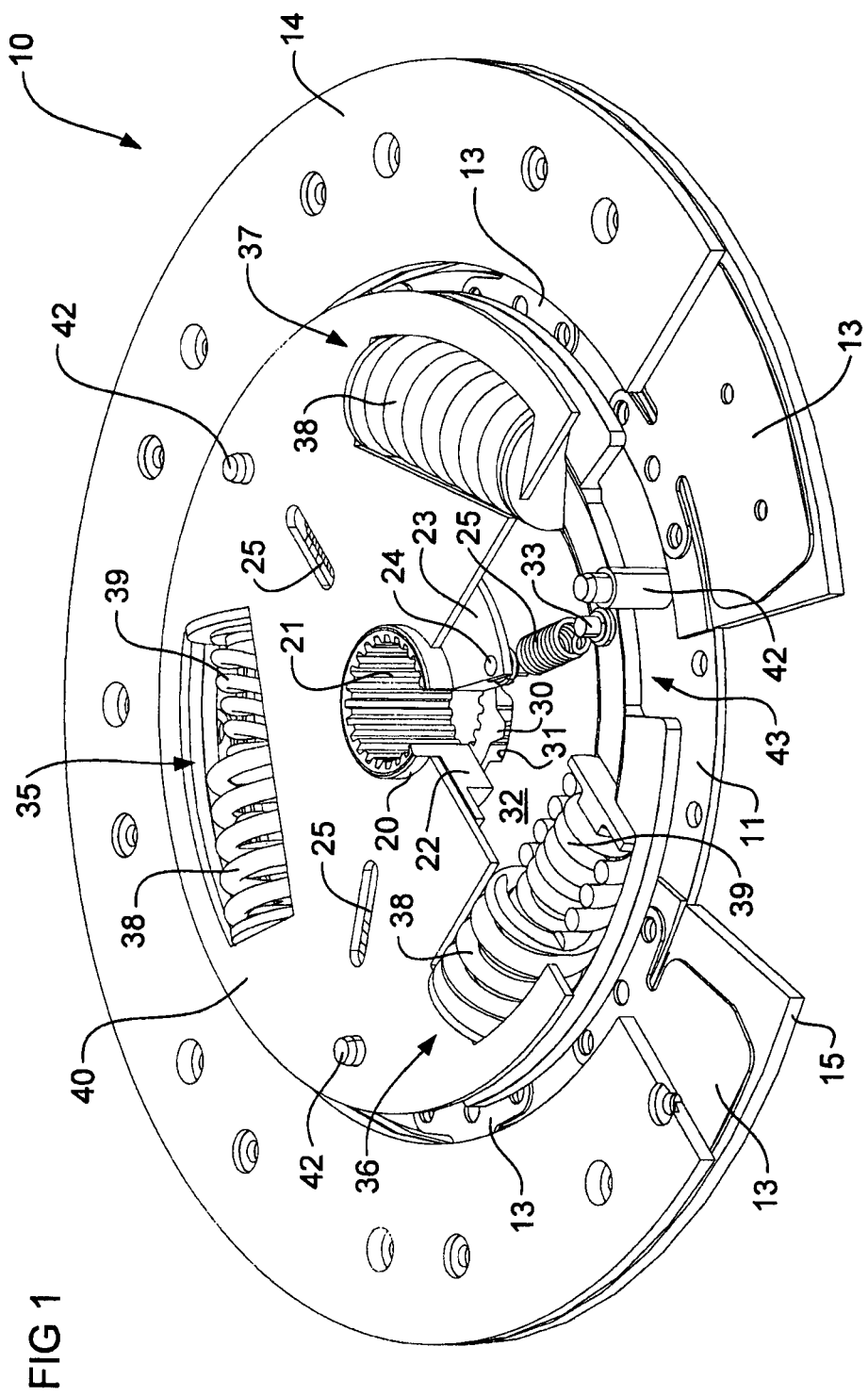
FIG. 1 is a perspective and partly cut-out view of a clutch plate according to one embodiment of the invention.

With reference to the figures, a clutch plate 10 is illustrated. The clutch plate 10 includes a main plate 11, a plurality of facing segments 13 which are fixed to the main plate 11, and friction facings 14 and 15 which are fixed to each side of the facing segments 13. The technique of fixing the facing segments 13 to the main plate 11 is well known. Likewise, the technique for fixing the friction facings 14 and 15 to the facing segments 13 is also well known.

The clutch plate 10 further includes a hub boss 20, which includes an internally splined surface 21. The internal surface 21 is sized to accept a complementary splined shaft (not shown) which connects to a vehicle transmission or gearbox. The spline connection between the hub boss 20 and the shaft allows axial movement of the shaft relative to the hub boss 20, but constrains the shaft to rotate with the hub boss 20 when the boss 20 is rotated.

A stepped shoulder 22 extends laterally from an outer surface of the hub boss 20. The stepped shoulder 22 is illustrated clearly in FIG. 3. The shoulder 22 includes several steps to accommodate various fittings of the clutch plate 10, and forms an upper annular ring 23. A rivet 24 is fixed to the ring 23 and accepts one end of a radial tension spring 25.

Figure 4:
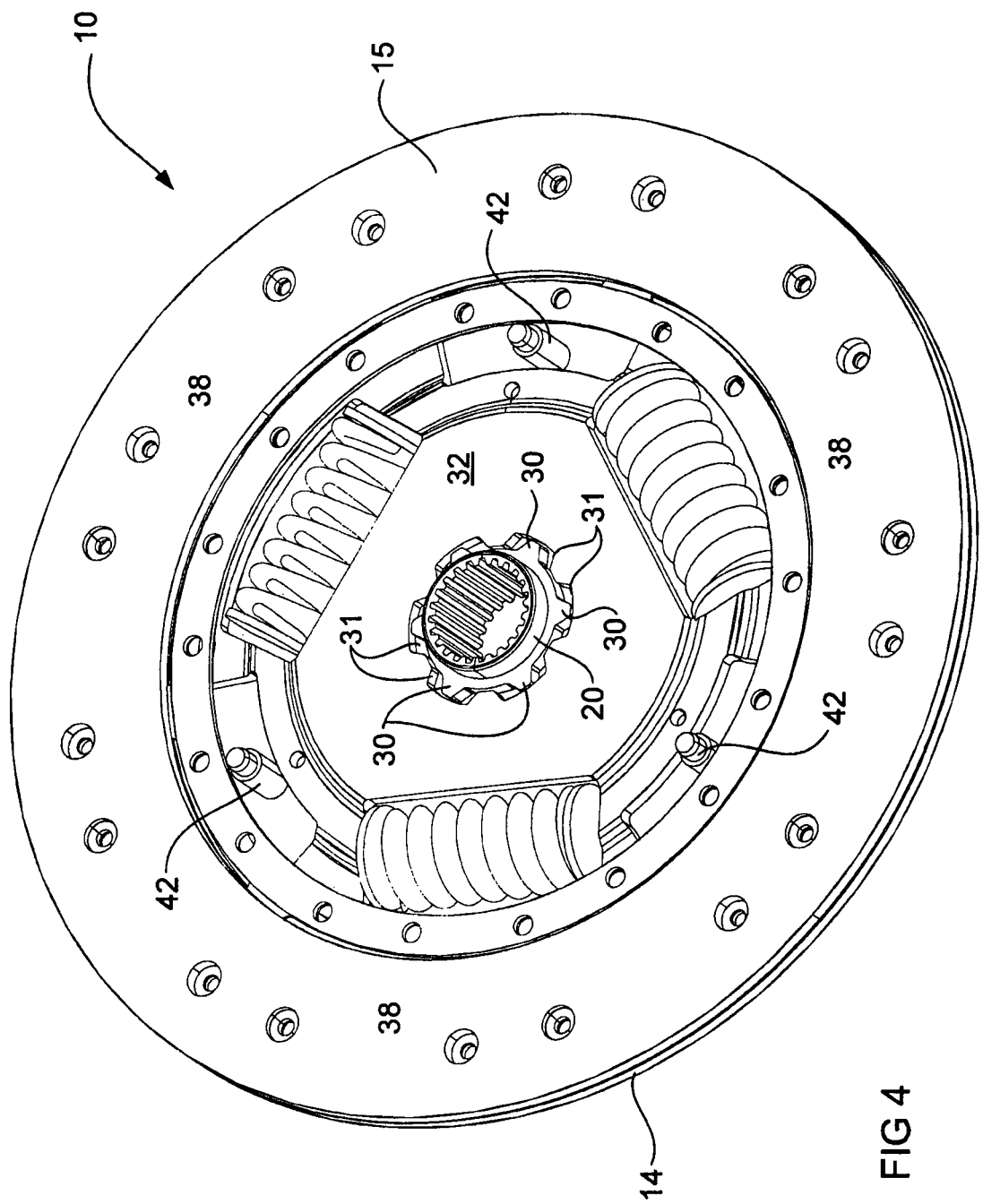
FIG. 4 is an underside view of the clutch plate of FIG. 1.

The hub boss 20 further includes a plurality of teeth 30 that extend about the boss 20 and which mesh with recesses 31 formed in a hub flange 32. This arrangement is better illustrated in FIG. 4, which is an underside view of the clutch plate 10. Each tooth 30 is received within a recess 31 and by this arrangement, the hub boss 20 can rotate through a limited angular displacement relative to the hub flange 32.

The radial tension spring 25 is anchored at its opposite end to a rivet 33 which is fixed to the hub flange 32. It will be appreciated, that by the arrangement of the teeth 30 and the recesses 31, the hub boss 20 and thus the annular ring 23 of the boss 20 can rotate relative to the hub flange 32. The respective rivets 24 and 33 can thus also shift relative to one another and thus the radial tension spring 25 can oscillate through an arc as it extends and contracts. It will further be appreciated, that as the relative movement takes place, the radial tension spring 25 exerts a biasing influence between the ring 23 and the hub flange 32, which progressively increases as the relative movement increases. The bias of the radial tension spring 25 tends to return the hub 20 and the hub flange 32 back to a home position when there is no torsional load on the clutch plate 10.

The radial tension spring 25 is illustrated in a cut-out portion of the clutch plate 10. Two further radial tension springs 25 are provided in the clutch plate 10 although they are substantially obscured. Nevertheless, the two further radial tension springs 25 have the same construction and operate in the same manner as the spring 25 discussed above. The three springs 25 are spaced apart equidistantly at 120° to each other.

The clutch plate 10 further includes drive springs 35, 36 and 37. Each of these springs comprises an outer spring 38 and a co-axial inner spring 39. The drive springs 35 to 37 act between the hub flange 32, the side plate 40 and the main plate 11. The side plate 40 is fixed by stop pins 42 to the main plate 11 to form a plate assembly as previously defined herein. Accordingly, the side plate 40 and the main plate 11 are fixed to each other against relative rotation.

The hub flange 32 is rotatable relative to the plate assembly 11, 40 through an angular displacement which is controlled by the drive springs 35 to 37. The maximum angular displacement is controlled by the stop pins 42 which are disposed within a recesses 43 (only one of which is fully visible in FIG. 1) formed in the edge of the hub flange 32. This aspect of the clutch plate 10 is an arrangement which is already adopted in prior art clutch plates.

The operation of the clutch plate 10 in drive mode is as follows. When the clutch is engaged, the friction facing 15 is forced into frictional engagement with a pressure plate on one side and flywheel which is connected to the crank shaft of an internal combustion engine on the other side. Upon that frictional engagement, the plate assembly 11, 40 is driven to rotate. That rotation is transmitted to the hub flange 32 via the drive springs 35 to 37. Rotation of the hub flange 32 is transmitted to the hub boss 20 via the radial tension springs 25 and thereafter through the teeth 30 of the hub boss 20. As previously described, irregular impulses created by the internal combustion engine can create unwanted driveline noise. The driveline noise is particularly evident when the vehicle is in neutral gear and the clutch is engaged.

These impulses can be dampened through the arrangement discussed above as explained below.

The radial tension springs 25 and the drive springs 35 to 37 each provide dampening for torsional vibration that is transmitted through the clutch plate 10 from the internal combustion engine. The radial tension springs 25 dampen vibration that would otherwise cause gear rollover noise and the ability of the springs to dampen that noise is facilitated by the wide angle of displacement that the radial orientation of the springs provides as compared to circumferential springs of the prior art.

Figure 5:
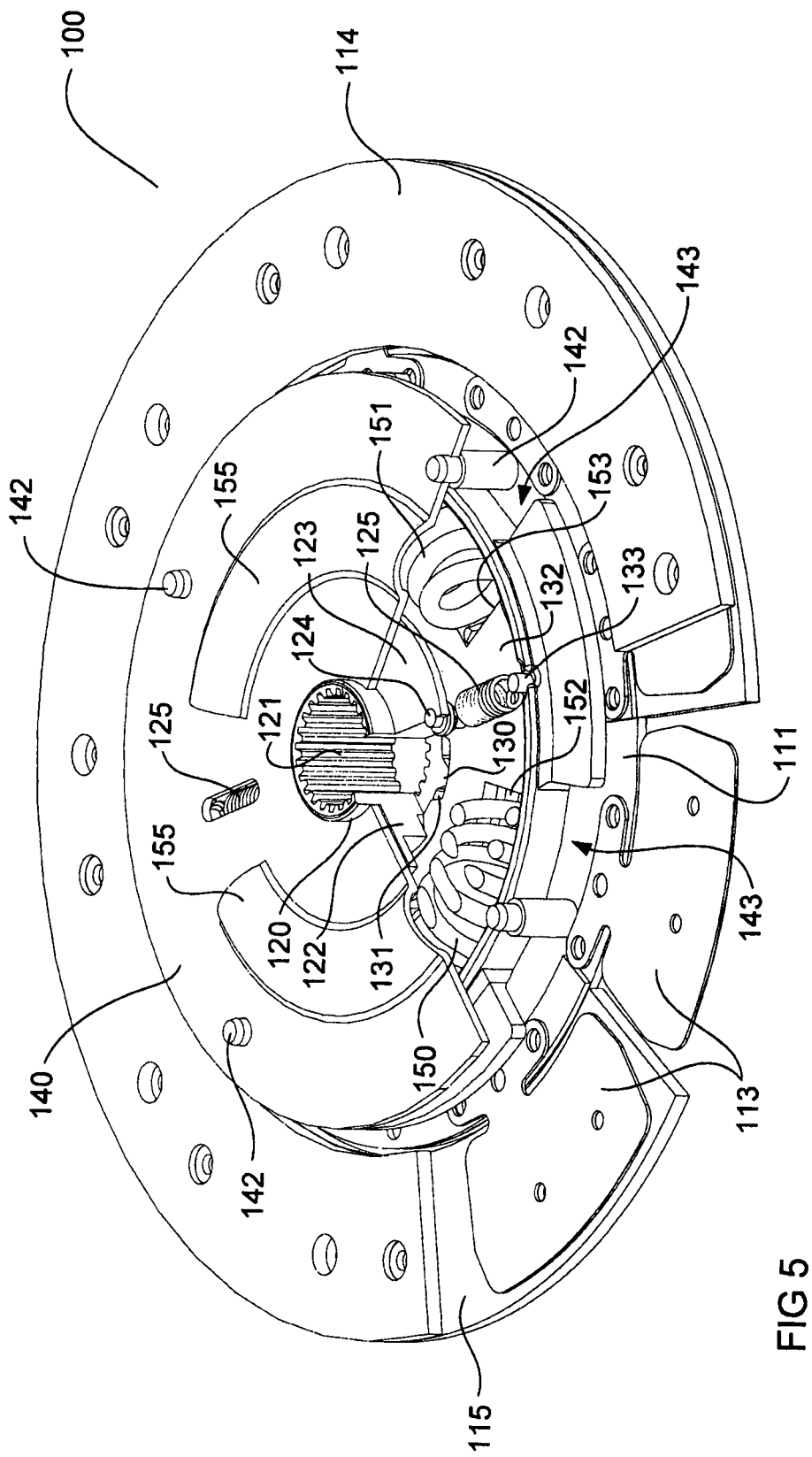
FIG. 5 is a perspective and partly cut-out view of a clutch plate according to an alternative embodiment of the invention.

FIG. 5 illustrates an alternative form of the invention, although it includes radial tension springs of the kind described in relation to the clutch plate 10 of FIGS. 1 to 4. In FIG. 5, many of the features of FIG. 1 remain and therefore those features have the same reference numeral plus 100.

Accordingly, the clutch plate 100 includes a main plate 111 and a side plate 140 to form a plate assembly as previously defined herein, facing segments 113 and friction facings 114 and 115. A hub boss 120 is provided which includes a splined surface 121. A pair of radial tension springs 125 extend between a flange or ring 123 that extends from the hub boss 120 and connects to a rivet 133 which is fixed to the hub flange 132. In respect of the radial tension springs 125, only two of those springs are provided in the clutch plate 100, as compared to three springs provided in the clutch plate 10.

The clutch plate 100 further includes, a plurality of stop pins 142 connecting the main plate 111 and the side plate 140 rigidly together, and recesses 143 in the hub flange 132.

The clutch plate 100 further includes a pair of curved drive springs 150, 151. The drive springs 150, 151 are compression springs, each of which has a substantially constant radius of curvature and each of which is mounted concentrically about the hub boss 120 in substantially diametrically opposed relationship. The drive springs 150 and 151 are substantially identical in respect of spring length and spring constant.

A visual comparison between the drive springs 150, 151 and the drive springs 35, 36 and 37 of the clutch plate 10 shows that the drive springs of the clutch plate 100 are significantly longer than that of the clutch plate 10. In the clutch plate 10, to maximise the available angular displacement between the plate assembly 11, 40 and the hub flange 32, the drive springs 35, 36 and 37 must be located at the maximum distance from the centre of the hub boss 20. This maximises the length of the drive springs. As is apparent in FIG. 1, the diameter of the hub flange 32 restricts the maximum length of the drive springs, so that if a longer drive spring is required, the drive springs must be moved inwardly towards the hub boss 20. But as the springs are moved closer to the hub boss 20, they need to be stronger to transmit the same torque compared to a spring which is positioned further out. This makes it more difficult to obtain the wider angular displacement, because the wire diameter of the coil of the spring must be increased to meet greater strength/torque requirements.

Returning to the clutch plate 100 of FIG. 5, the drive springs 150, 151 extend through approximately 60°. The length of the drive springs 150 and 151 is limited by the need to provide abutments in the plate assembly 111, 140 and the hub flange 132 for the opposite ends of the springs to engage. In addition, in the form of the clutch plate 100 illustrated in FIG. 5, the length of the drive springs 150 and 151 is limited by the need to position the radial tension springs 125 between opposite ends of the drive springs 150, 151.

The drive springs 150, 151 can be manufactured to have the appropriate curve, or they can be manufactured as straight drive springs, for example somewhat equivalent to the outer springs 38 of the clutch plate 10, with the curve of the drive springs being imposed by the structure of the clutch plate 100. For example, in FIG. 5, it can be seen that each of the drive springs 150, 151 is disposed within a respective slot 152 and 153, and while not easily visible in FIG. 5, those slots include curved side edges that impose the required curve on the springs 150, 151 when they are inserted into the slots 152, 153.

Figure 6:
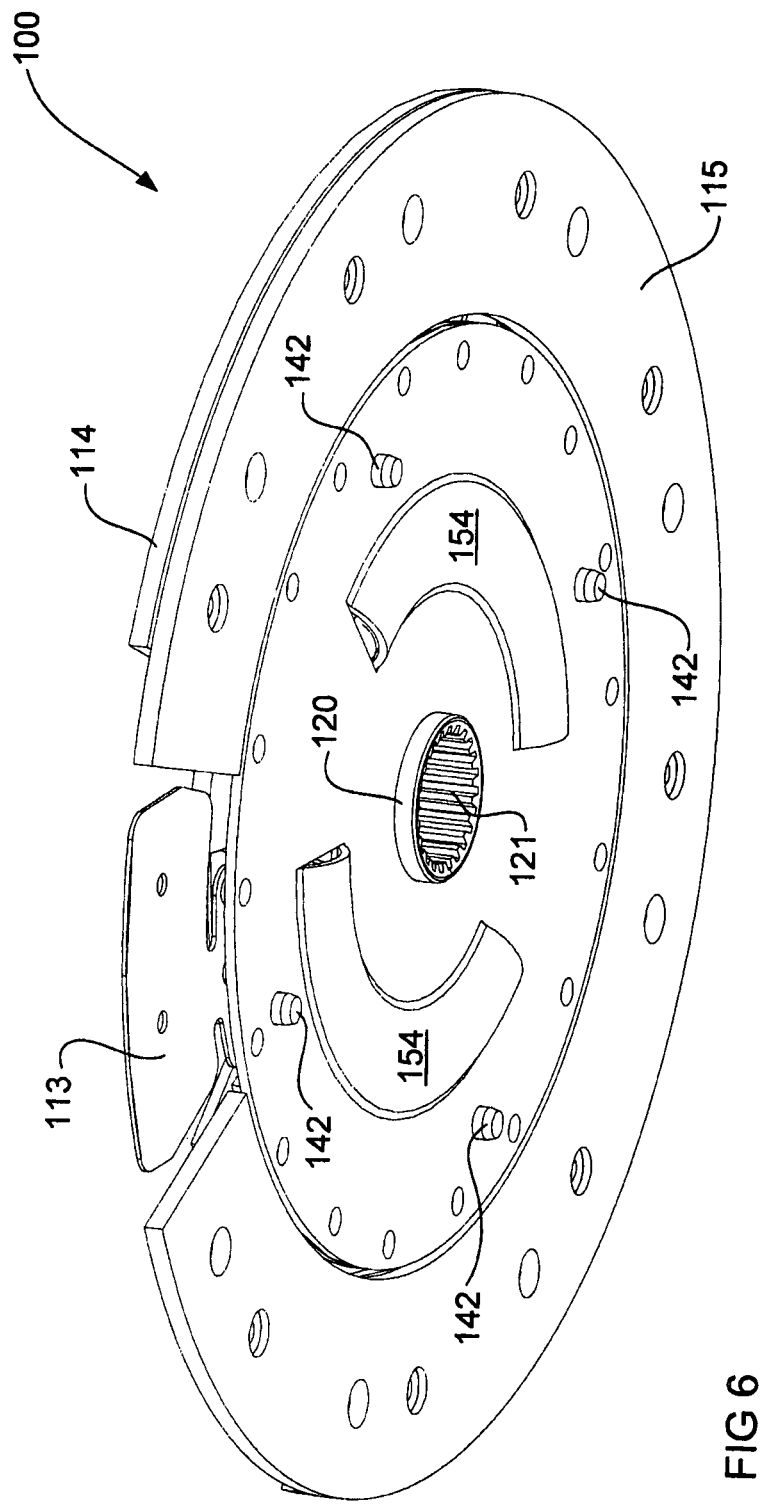
FIG. 6 is an underneath view of the clutch plate illustrated in FIG. 5.

Moreover, each of the main plate 111 and the side plate 140 include concave curved spring guides 154, which are visible in FIGS. 5 and 6, with FIG. 6 showing an underneath view of the clutch plate 100 of FIG. 5. It can be seen that each of the spring guides 154 and 155 is formed into the plates 111 and 140.

The spring guides 154 and 155 can contribute to maintaining the drive springs 150 and 151 in a curved configuration. Indeed, the curved spring guides 154 and 155 can be the structure that maintains the drive springs 150, 151 in the curved orientation. In such an arrangement, the slots 152 and 153 within which the springs are disposed may have no effect on maintaining the drive springs 150, 151 curved.

Alternatively, each of the slots 152, 153 and the curved spring guides 154, 155 may contribute to maintaining the drive springs 150, 151 in the curved configuration.

The clutch plate 100 is shown having a pair of radial tension springs 125. It is to be appreciated that those springs 125 are shown as an optional addition to the clutch plate 100 and might not be required in certain constructions of a clutch plate according to the invention. However, the clutch plate 100 includes provision for dampening engine impulses in the drive mode through the drive springs 150, 151 and in an idle mode, in which the clutch is engaged but the transmission is in neutral, to dampen engine impulses that would otherwise cause gear roll-over noise.

Figure 7:
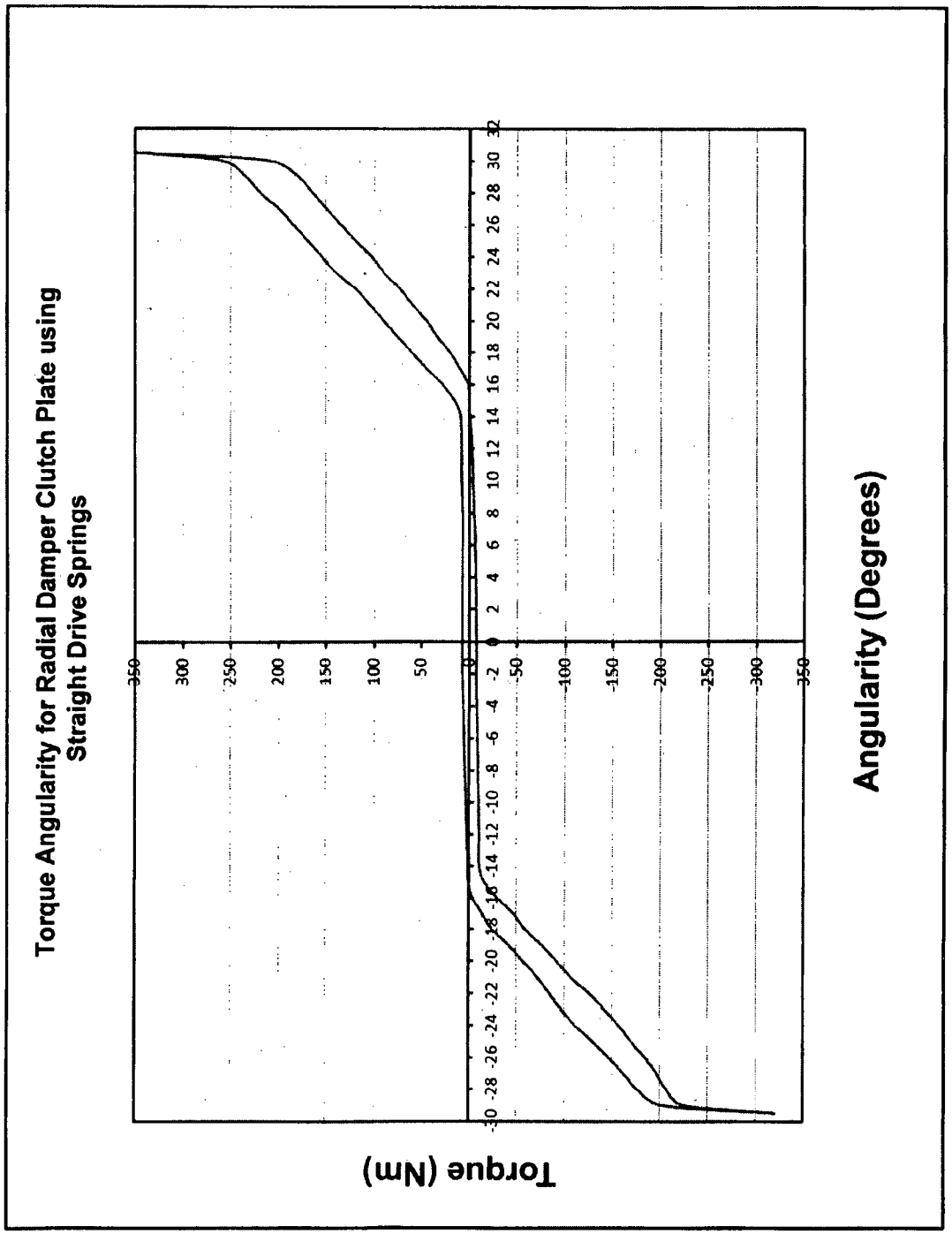
FIGS. 7 and 8 are graphs illustrating the performance of clutch plates of the invention in which FIG. 7 relates to a clutch plate having straight drive springs and FIG. 8 relates to a clutch plate having curved drive springs
Figure 8:
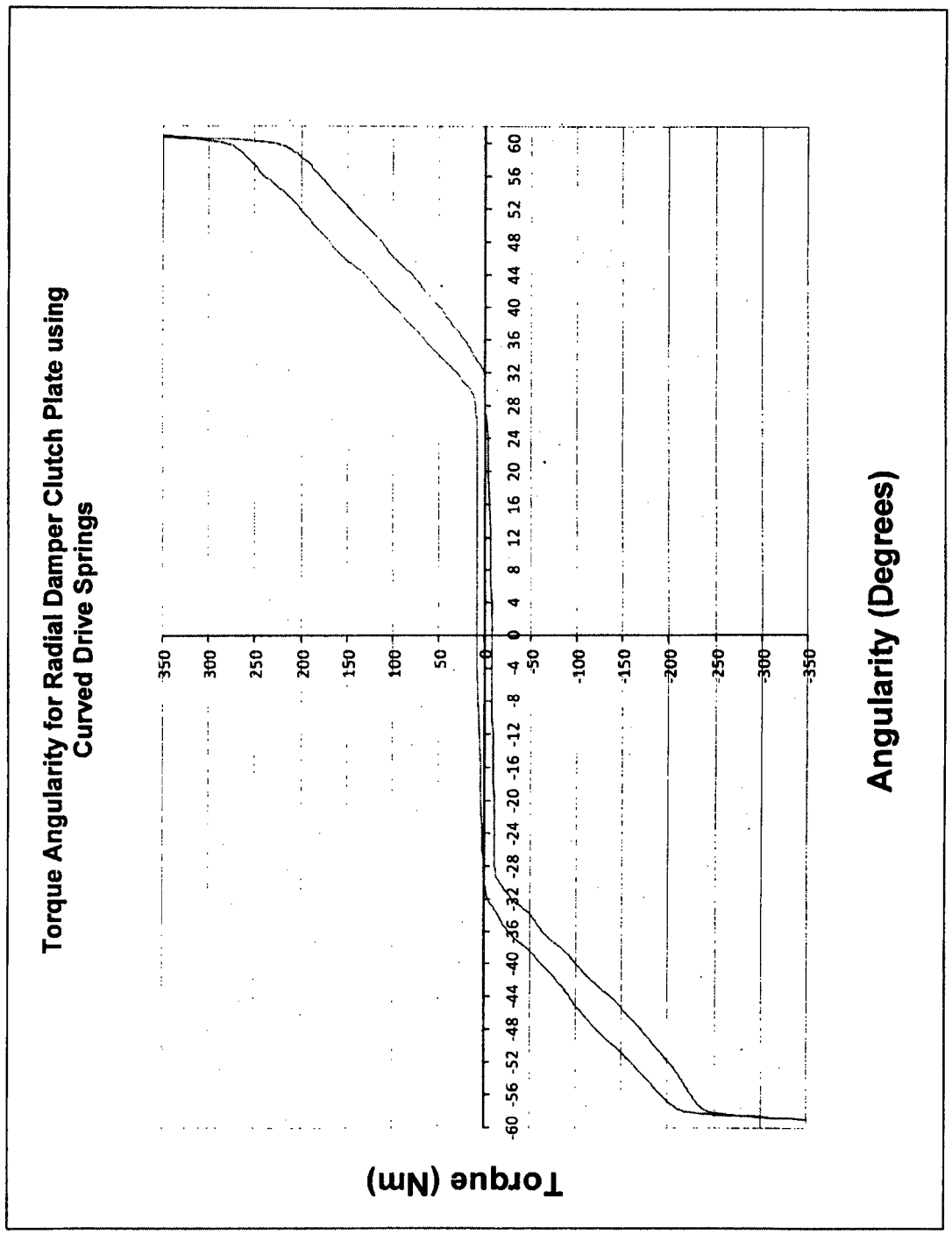
Figure 9:
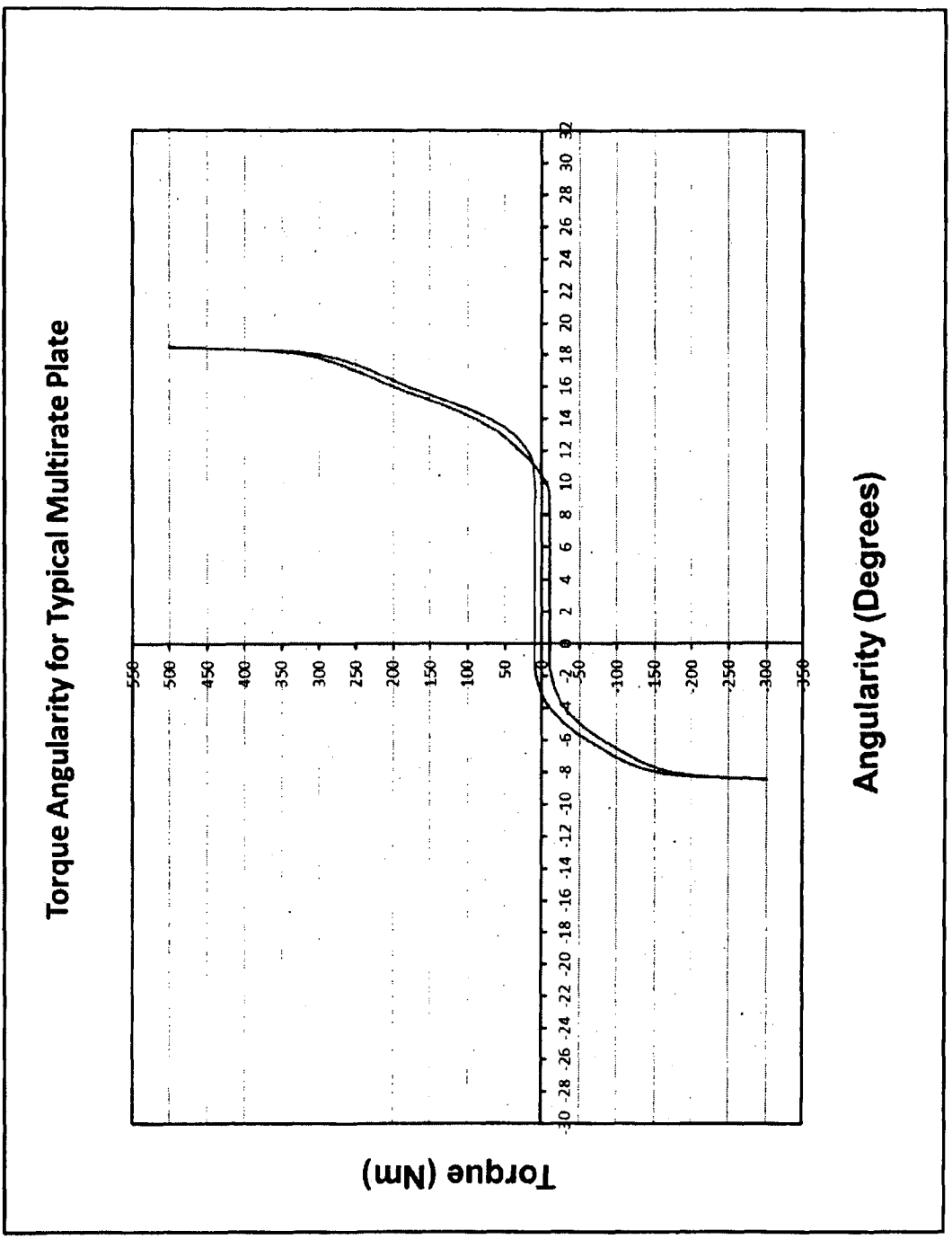
FIGS. 9 and 10 are graphs illustrating the performance of a clutch plates of the prior art.

FIGS. 7 to 10 provide graphic illustration of the improvements which can be secured through the use of radial tension springs in the form of the invention illustrated in FIGS. 1 to 6, as compared to prior art arrangements which employ circumferential compression springs. FIG. 7 graphs an arrangement including straight radial tension springs while FIG. 8 graphs an arrangement including curved radial tension springs, each according to the invention. FIGS. 8 and 9 graph prior art arrangements.

Figure 10:
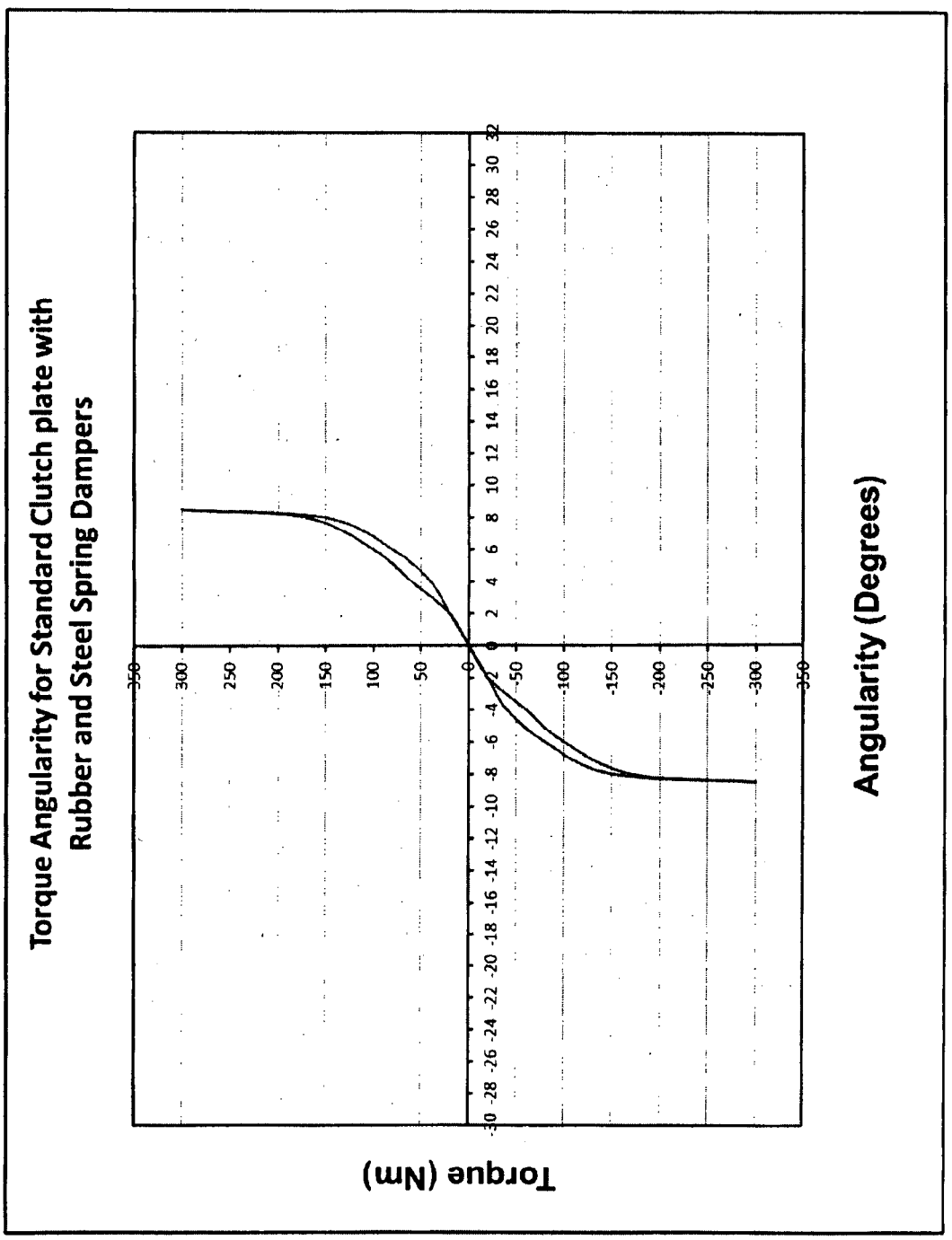

It can be seen from the graph of FIGS. 7 and 8, that a substantial increase in the angular displacement is available as compared to the graphs illustrated in FIGS. 9 and 10.

The invention described herein is susceptible to variations, modifications and/or additions other than those specifically described and it is to be understood that the invention includes all such variations, modifications and/or additions which fall within the spirit and scope of the above description.

The invention claimed is:

1. A clutch plate including:
   a plate assembly having an annular periphery to which an assembly of friction material is applied to face in each of opposite directions,
   a hub for connection to an output shaft,
   a hub flange drivable by the plate assembly to rotate,
   the hub being drivable to rotate by the hub flange,
   the hub and the hub flange being angularly displaceable relative to each other within a predetermined range and being coupled together by a coil spring which extends radially relative to the axis of rotation of the hub and which applies a biasing load against relative angular displacement between the hub and the hub flange, opposite ends of the coil spring being anchored to the hub and the hub flange by rivets that are upstanding from the hub and the hub flange.

2. A clutch plate according to claim 1, the hub and the hub flange being coupled together by a pair of radial coil springs disposed diametrically opposite to each other.

3. A clutch plate according to claim 1, the hub and the hub flange being coupled together by three radial coil springs disposed at 120° to each other.

4. A clutch plate according to claim 1, the hub and the hub flange being coupled together by four radial coil springs disposed at 90° to each other.

5. A clutch plate according to claim 1, the radial coil spring having a length dimension of between 20 and 60 mm.

6. A clutch plate according to claim 5, the radial coil spring having a length dimension of 30 mm.

7. A clutch plate according to claim 1, the radial coil spring having a spring constant in the range of 1 to 10 Kg/mm.

8. A clutch plate according to claims 1, the radial coil spring allowing angular displacement of up to 60°.

9. A clutch plate according to claim 1, the hub and the hub flange being further coupled together by at least two drive springs, which are positioned equidistantly about the hub, the drive springs being compression springs and being curved and having a constant radius of curvature and being mounted concentric about the hub, the drive springs applying a biasing load against relative angular displacement between the plate assembly and the hub flange.

10. A clutch plate according to claim 1, the hub and the hub flange being further coupled together by two drive springs, which are positioned on opposite sides of the hub.

11. A clutch plate according to claim 10, the hub and the hub flange being further coupled together by two radial tension springs and radially outer ends of the radial tension springs being anchored to the hub flange between facing ends of the drive springs.

12. A clutch plate according to claim 1, the hub and the hub flange being further coupled together by three drive springs, which are positioned at 120° to each other.

13. A clutch plate according to claim 12, the hub and the hub flange being further coupled together by three radial tension springs and radially outer ends of the radial tension springs being anchored to the hub flange between facing ends of the drive springs.

14. A clutch plate according to claim 1, the hub and the hub flange being further coupled together by four drive springs, which are positioned at 90° to each other.

15. A clutch plate according to claim 1, the hub and the hub flange being further coupled together by at least two drive springs, which are coil springs.

* * * * *